July 26, 1932.  O. W. ATTERBURY  1,869,295
GRASS SHEARS
Filed Feb. 18, 1931  2 Sheets-Sheet 1
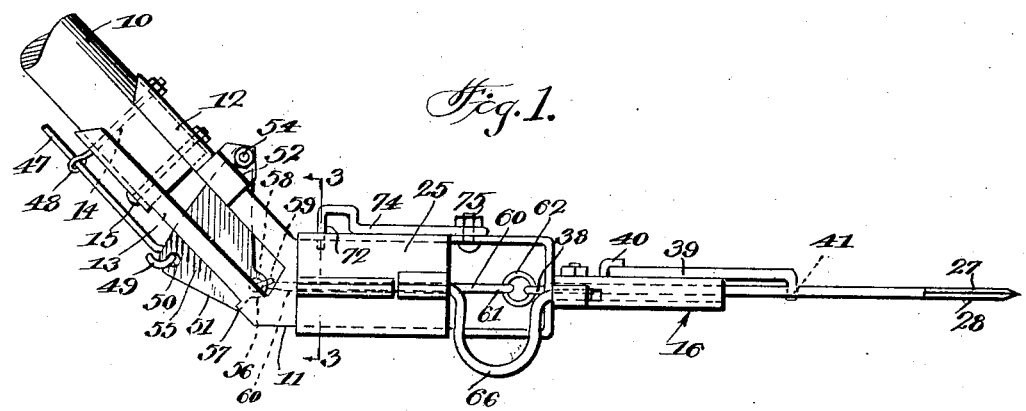
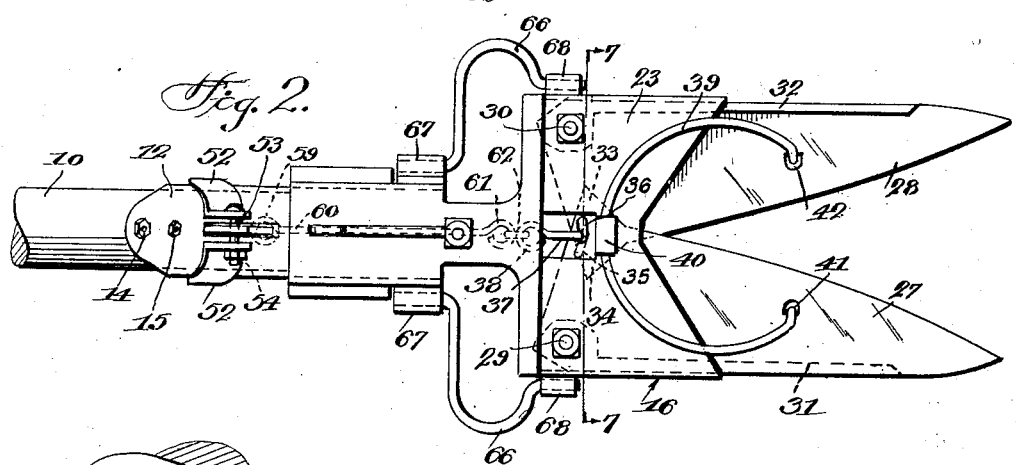
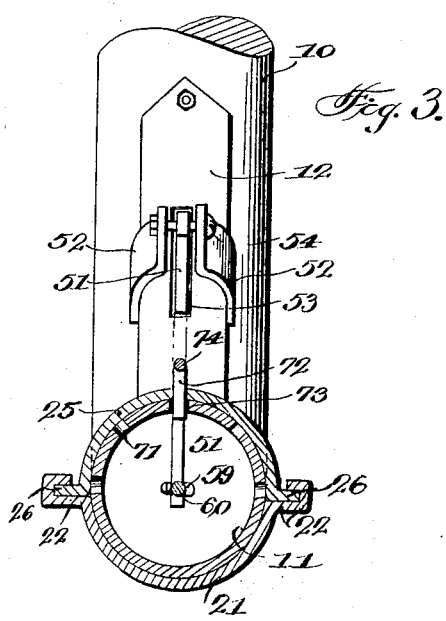
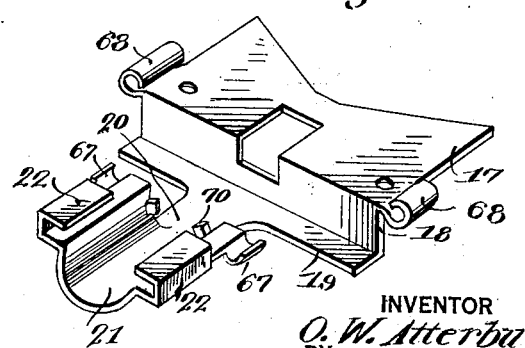
INVENTOR
O. W. Atterbury
BY
ATTORNEY July 26, 1932.   O. W. ATTERBURY   1,869,295
GRASS SHEARS
Filed Feb. 18, 1931   2 Sheets-Sheet 2
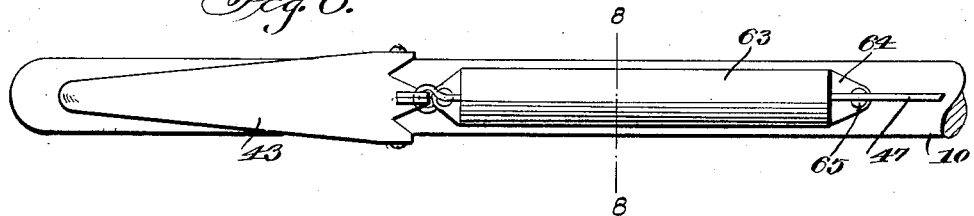
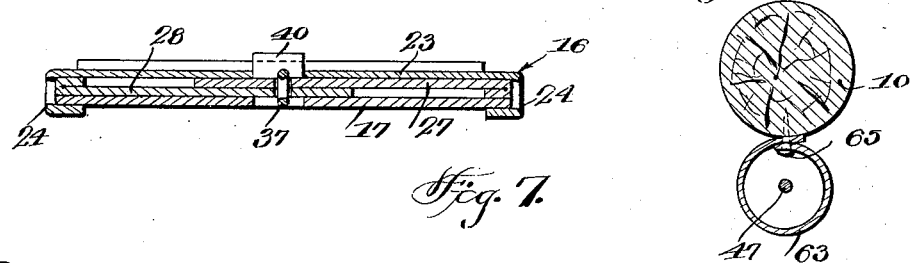
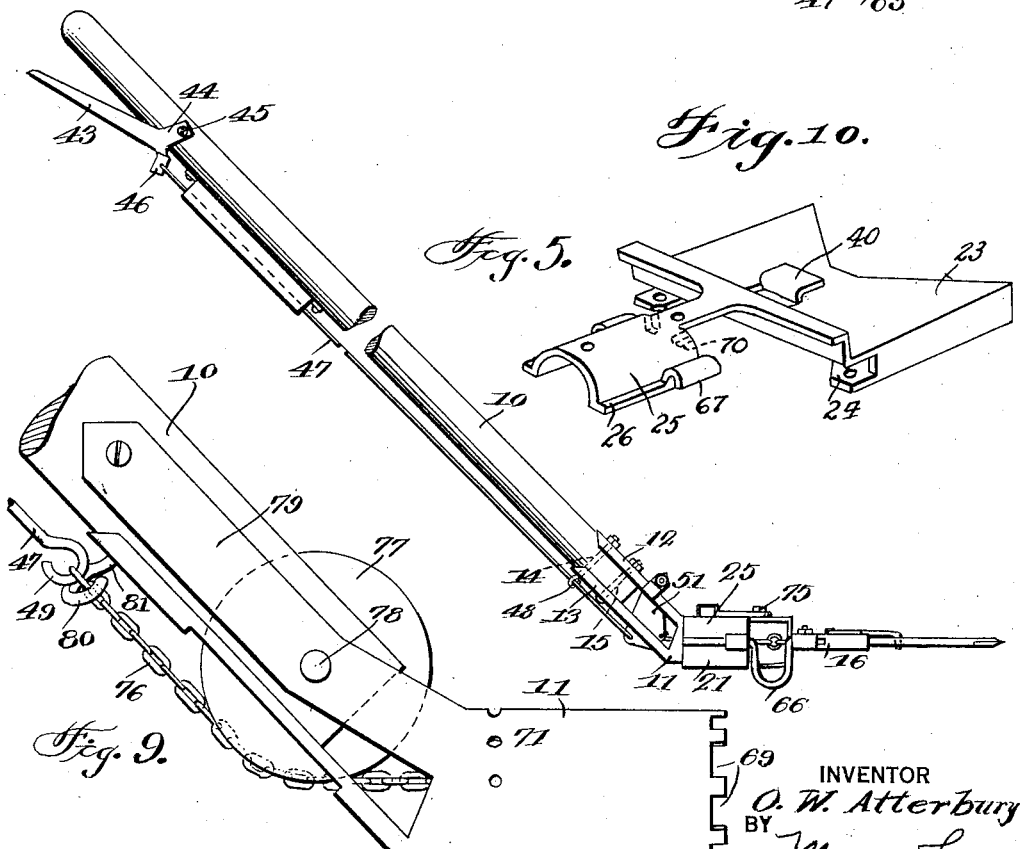
INVENTOR
O. W. Atterbury
BY
ATTORNEY Patented July 26, 1932

1,869,295

UNITED STATES PATENT OFFICE

OSCAR W. ATTERBURY, OF SAN ANTONIO, TEXAS

GRASS SHEARS

Application filed February 18, 1931. Serial No. 516,750.

My invention relates to grass shears and particularly to shears used in trimming the edges of lawns and around fences, bushes and the like.

It is an object of the present invention to provide a grass shears which may be operated while standing so as to relieve the operator from the strain of manipulating the shears from a stooping position.

A further object is to provide such a device in which the shears are adjustable to any desired angle with respect to the handle so as to avoid the awkwardness and strain of tilting the handle far over to either side in order to bevel or curve the edges of the lawn.

A still further object is to provide a shears in which the operating parts may readily be stamped from sheet metal, which may be quickly and easily disassembled for the repair or replacement of worn or broken parts and which is particularly easy to operate.

Other parts not specifically mentioned will become apparent during the course of the following detailed description when read in conjunction with the accompanying drawings which form a part of this specification and in which:

Figure 1 is a side elevation of a portion of the device;

Fig. 2 is a top plan view thereof;

Fig. 3 is a cross section on the line 3—3 of Fig. 1;

Fig. 4 is a perspective view of a portion of the device;

Fig. 5 is a side elevation of the complete device;

Fig. 6 is a bottom plan view of the upper portion of the handle;

Fig. 7 is a cross section on the line 7—7 of Fig. 2;

Fig. 8 is a cross section on the line 8—8 of Fig. 6;

Fig. 9 is a detail view of a modified form of the invention, and

Fig. 10 is a perspective view of a portion of the device.

Referring now to the invention in detail, 10 indicates an elongated rounded handle, preferably formed of wood and which is normally disposed at an angle of about 45° with respect to the horizontal.

The lower end of the handle is provided with a horizontally disposed and forwardly directed tubular coupling member in the form of a shank 11. The coupling member 11 is secured to the handle 10 by means of attaching arms 12 and 13 which are disposed at an angle to the shank 11 and are preferably formed integral therewith, the arms 12 and 13 clamping the lower end of the handle between them. An eye bolt 14 and a screw headed bolt 15 which pass through the arms and the handle serve to securely fasten the arms and shank to the handle 10.

A relatively flat and wide supporting casing 16 is supported forwardly of and in substantial alinement with the shank 11. The casing 16 is formed in two parts, the lower half being shown in Fig. 4. The lower half comprises a relatively wide flat plate 17 which terminates in a right angularly disposed depending portion 18 which in turn terminates in a rearwardly extending portion 19. The rearwardly extending portion 19 has an arm 20 extending rearwardly therefrom approximately midway of the ends thereof. The arm 20 has the end portion 21 thereof formed semi-cylindrical in shape with the edges formed into inwardly directed channel guides 22. The top half of the casing 16 is formed similar to the lower half except that the top plate 23 has its sides terminating in depending inwardly directed channel guides 24 which embrace the edges of the plate 17 to form a socket between the two plates for the reception of the cutting blades to be presently described. The semi-cylindrical portion 25 has its edges formed to produce flat outwardly directed flanges 26 which are received by the guides 22 thereby serving to lock the two halves together and producing a tubular socket or sleeve which is received on the tubular shank or coupling 11.

A pair of cutter blades 27 and 28 are pivotally mounted within the casing 16 and between the plates 17 and 23. The blades are substantially triangular in shape and the diverging cutting edges are disposed in overlapping relationship when the shears are closed as is common in cutters of this general type. A bolt 29 passes through the casing 16 adjacent one edge thereof and through an opening in the blade 27 at the apex opposite the cutting edge thereof. A bolt 30 extends through the casing 16 at a point opposite to the bolt 29 and through an opening in the blade 28 at the apex opposite the cutting edge thereof. The back edges of the blades 27 and 28 are folded over upon themselves as indicated at 31 and 32 for the purpose of giving rigidity to the blades, also to aid in disposing the cutting edges thereof in proper cutting relationship.

The apexes 33 and 34 of the blades 27 and 28 opposite the backs and at the rearward terminus of the cutting edges are each provided with laterally disposed registering slots 35 and 36 respectively for the reception of a steel wire or hook member 37. The hook 37 terminates rearwardly in an eye 38 for attachment to an operating linkage to be presently described. It will be obvious that a rearward pull on the hook 37 will result in closing of the blades 27 and 28. The blades are normally held in the open position shown in Fig. 2 by a bowed spring 39 which is secured centrally to the top of the plate 23 by a clamping ear 40 which is preferably struck out of said plate. The free ends of the bowed spring 39 are hooked into slots 41 and 42 in the blades 27 and 28 respectively. The ends of the bowed spring are also sprung in opposite directions so as to exert a downward pressure on the blade 27 and an upward pull on the blade 28, thereby further insuring proper contact of the blades during the cutting operation.

The operating mechanism for the cutters 27 and 28 consists of a hand lever 43 which is pivotally secured to the handle by means of ears 44 and pivot bolt 45. The hand lever 43 is provided with a perforated lug 46 which extends opposite to the ears 44 and to which the upper end of an operating rod 47 is secured. The operating rod extends longitudinally of the handle 10 and through the eye 48 of eye bolt 14, the eye forming a guide for the lower end of the rod. The lower end of the rod 47 is formed with an eye 49 which is engaged through a perforation 50 in one corner of a pivoted triangular plate 51. The triangular plate 51 is pivotally supported between a pair of ears 52 struck up from either side of the arm 12, the plate extending through a slot 53 between said ears. A bolt 54 serves as a pivot for said plate. The plate 51 extends downwardly through a slot 55 in the lower arm 13 and is formed with a forward projection 56 on the forward side thereof, the plate being cut back below the projection to produce a shoulder 57 which abuts against the forward end wall of the slot 55 to limit the forward pivotal movement of the plate 51. The projection 56 is provided with a perforation 58 engaged by the eye 59 of a link 60 which extends forwardly through the tubular coupling 11. The forward end of the link 60 terminates in an eye 61 which is connected to the eye 38 of the hook 37 by means of a ring 62.

It will thus be seen that operation of the hand lever 43 will result in a pull on the rod 47, which through plate 51 and link 60 will result in a rearward pull on the hook 37 and operation of the cutters 27 and 28 against the action of spring 39. The spring 39 normally urging the blades apart produces a forward pull on the hook 37 and link 60 thereby tensioning the parts and causing forward movement of the plate 51 so as to engage the shoulder 57 with the end of the slot 55.

A tubular guard 63 provided with attaching ears 64 at either end is secured to the handle 10 by means of screws 65. The rod 47 passes through the tubular guard so as to allow a firm grip of the handle without interfering with the action of the rod 47.

In order to provide a rest for the device during operation, a pair of runners are provided. The runners 66 are in the form of heavy U-shaped wires which extend obliquely downwardly of the casing 16 and socket carried thereby, the ends of the wire runners being secured to the socket and casing respectively by clamping ears 67 and 68 formed with these parts.

In order to provide for the angular adjustment of the casing 16 and cutters 27 and 28, the socket formed by parts 21 and 25 is made rotatable upon the tubular shank 11 and means are also provided for locking the parts in adjusted position. The forward end of the shank 11 is provided with circumferentially spaced notches 69 in which lugs 70 carried by the members 21 and 25 are engaged when the parts are in engagement. In order to prevent the parts from being accidentally pulled apart so as to disengage the lugs 70 from the notches 69, a plurality of circumferentially alined perforations 71 are formed in the tubular shank 11. A locking pin 72 which extends through a perforation 73 in the part 25 and through one of the perforations 71 in the tubular shank 11 serves to prevent relative endwise movement of the shank and socket. The locking pin 72 is formed by bending the end of a wire 74 downwardly, the wire being secured to the member 25 by a bolt 75. The shank 11 and socket 21–25 will normally be urged together by the tension of the spring 39 due to the limiting of the forward pivotal movement of the plate 51 and the resultant tensioning of the connections between said plate and the blades 27 and 28.

When it is desired to change the angular adjustment of the blades with respect to the horizontal, the pin 72 is disengaged from the perforations 71 and 73 and the socket is moved off of the shank 11 far enough to disengage the lugs 70 from the notches 69. Slack sufficient for this purpose is created by bringing the outer points of the cutting blades 27 and 28 together with the hand. The socket and casing may then be rotated to the desired angle and the parts allowed to spring back into position. The eye and ring connections of the cutter operating linkage permits quite a great angular adjustment without binding of the parts.

In the modification shown in Fig. 9, a chain 76 or other flexible connection is trained around a pulley 77 which is rotatably mounted upon a bolt 78 which extends transversely of the handle 10 and through arms 79 which embrace the sides of the handle at the lower end thereof. The arms 79 are formed with the shank 11 as in the case of the arms 12 and 13. The chain is connected at one end to the eye 49 of the rod 47 and at the other end to the eye 38 of the hook 37 and passes through the eye 80 of screw 81. The tension on the connecting parts created by engaging the shoulder 57 of the plate 51 with the forward end of the wall of the slot 55, in the first form described, is achieved in the modified form by having the eye 49, at the end of the rod 47, abut against the screw eye 80 as the blades are forced apart by the spring 39. Otherwise the operation of this form of the invention is the same as that of the first form.

Although a preferred embodiment of the invention has been shown and described, it will be understood that various changes in the details of construction may be made without departing from the spirit of the invention as defined by the appended claims.

I claim:

1. In a device of the character described, a handle member, an angularly disposed shank carried by the lower end of said handle, a blade holder having a socket received on said shank and a pair of pivoted cooperating cutting blades carried by said holder.

2. In a device of the character described, a handle member, a tubular shank carried by the lower end of said handle and extending at an angle thereto, a blade supporting member having a socket for mounting on said shank, a pair of cooperating pivoted cutting blades carried by said supporting member, and an operating mechanism for said blades.

3. In a device of the character described, a handle member including an angularly disposed tubular shank, a blade supporting member including a tubular sleeve received on said shank and rotatably adjustable relative thereto, means for locking said shank and sleeve against relative rotation, a pair of cooperating shear blades pivotally mounted on said blade supporting member, an operating lever carried by said handle, and a connection between said lever and said blades extending through said shank and sleeve for actuating the blades upon operation of said lever.

4. In a device of the character described, a handle member including an angularly disposed tubular shank, a blade supporting member mounted on said shank for axial rotative adjustment relative thereto, said member being formed of a pair of slidably connected sections, shear blades carried between the sections of said supporting member, an operating lever carried by said handle, and means connecting said blades and operating handle, said means extending through said tubular shank.

OSCAR W. ATTERBURY.